(12) United States Patent
Sohal

(10) Patent No.: US 7,816,427 B2
(45) Date of Patent: *Oct. 19, 2010

(54) GEL COMPOSITIONS

(75) Inventor: Muktiar Singh Sohal, East Sussex (GB)

(73) Assignee: Unigel Limited, Hong Kong (HK)

( * ) Notice: Subject to any disclaimer, the term of this patent is extended or adjusted under 35 U.S.C. 154(b) by 304 days.

This patent is subject to a terminal disclaimer.

(21) Appl. No.: 11/830,924

(22) Filed: Jul. 31, 2007

(65) Prior Publication Data

US 2008/0076854 A1      Mar. 27, 2008

Related U.S. Application Data

(63) Continuation of application No. 10/262,653, filed on Sep. 30, 2002, now Pat. No. 7,253,217, which is a continuation of application No. PCT/GB01/01428, filed on Mar. 29, 2001.

(30) Foreign Application Priority Data

Mar. 31, 2000   (GB)   ................... 0007827.9

(51) Int. Cl.
    *C08J 9/32*   (2006.01)
(52) U.S. Cl. ....................... 523/218; 523/219
(58) Field of Classification Search ................. 523/218, 523/219
    See application file for complete search history.

(56) References Cited

U.S. PATENT DOCUMENTS

| 4,333,706 A | 6/1982 | Davis et al. ............... 350/96.23 |
| 4,382,821 A | 5/1983 | Davis et al. ................. 106/272 |
| 4,709,982 A | 12/1987 | Corne et al. ............. 350/96.23 |
| 4,757,100 A | 7/1988 | Wichelhaus et al. ......... 523/173 |
| 5,335,302 A | 8/1994 | Polle .......................... 385/100 |
| 5,657,410 A | 8/1997 | Fehn et al. .................. 385/102 |
| 5,698,615 A | 12/1997 | Polle .......................... 523/173 |
| 5,761,362 A | 6/1998 | Yang et al. .................. 385/109 |
| 6,797,765 B2 * | 9/2004 | Pearce ........................ 524/505 |

FOREIGN PATENT DOCUMENTS

| DE | 3902029 | 7/1990 |
| EP | 0 067 009 | 12/1982 |
| EP | 0 653 764 A2 | 5/1995 |
| EP | 0 899 343 A2 | 1/1999 |
| WO | WO 99/15582 | 4/1999 |

* cited by examiner

*Primary Examiner*—Edward J Cain
(74) *Attorney, Agent, or Firm*—Heslin Rothenberg Farley & Mesiti PC; Alana M. Fuierer

(57) ABSTRACT

The invention relates to a composition which comprises a dispersion of micro spheres in a gel comprising an oily base and an organic polymeric gelling agent.

20 Claims, 2 Drawing Sheets

GEL COMPOSITIONS

This application is a continuation of U.S. patent application Ser. No. 10/262,653, filed 30 Sept. 2002, now U.S. Pat. No. 7,253,217 which is a continuation of PCT GB01/01428 filed 29 Mar. 2001.

This invention relates to gel compositions for filling cables, such as communication cables, in particular to gel compositions containing micro spheres, and to methods of preparing such gels.

BACKGROUND OF THE INVENTION

Communications cables typically comprise a signal-conducting core surrounded by a protective sheath. The core can, for example, conduct light signals or electrical signals. In many cables the space between the conductor and sheath contains a filler, the role of which is to protect and cushion the core from external forces that night be produced by, for example, bending or coiling, particularly in the case of fibre-optic cables. A further role of the filler is the prevention of water ingress which is particularly pertinent should the core comprise a metal such as copper. In order to fulfil these requirements, the filler must display a number of characteristics. The filler must be of sufficient viscosity in order to allow lateral movement of the core which occurs during, for example, bending, coiling or laying. The viscosity must however not be so low as to allow a drip wise loss of filler during vertical laying of cables. Moreover, this balance of properties must be maintained over a temperature range of −40 to +80° C. The filer must be formulated to be chemically compatible with cable grade polymers, which includes not only the cable sheath but also coatings typically found on optical fibres. The filler should also show a high degree of elasticity in order to absorb the force of impacts that the cable sheath may undergo during its operating lifetime. Relatively high ambient temperatures can be reached through fabrication of such cables resulting in thermal expansion of the filer which then leads to the formation of holes and cavities on cooling. Such holes and cavities can potentially become a water path which in fibre optic cables can lead to attenuation of the light wave guide. Thus cable filers should ideally show low thermal conductivity. For electrical applications or cores transmitting electrical signals, it is advantageous if the filler has a low permitivity thus insulating the conducting core. This has the additional benefit of rendering the filler hydrophobic thereby protecting the core from water ingress. The anti-drip resistance of fillers can be improved by reducing their specific weight. Finally, for easy handling, it is preferred if the filler is semi-dry to the touch, rather than sticky.

Existing fillers used in telecommunication cables include oil gels which are primarily blends of oils and gelling agents. In application, they penetrate between bundles of, for example, densely packed insulated copper conductors and in so doing insulate them from moisture. The oil, which comprises a major part of the blend, can be a naphthenic or paraffinic processing oil, a mineral oil, a synthetic product such as a polybutane or a silicone oil. Gelling agents include waxes, silicic (silica gels) acids, fumed silica, fatty acid soaps and thermoplastic elastomers. Typically the gelling agent comprises less than 10% of the whole.

One particular family of thermoplastic elastomers marketed under the trade mark 'Kraton' (Shell Chemical Company), comprises di-block, tri-block or multi-arm molecular configurations of rubber and polystyrene segments.

U.S. Pat. No. 5,657,410 describes an optical transmission element which includes a filer comprising between 80% and 95% by weight of a monomeric plasticizer having a molecular weight in the range 200-2000 grams per mole. Such monomeric plasticizers include esters of phthalates, trimellitates, phosphates and fatty esters. Additional substances may also be added such as thickeners. The thickener can take the form of small spheres. Hollow spheres are preferred due to their great compressibility and easy processability. Thixotropic agents may also advantageously be added. They include finely divided or fumed silica, alumina, and bentonites as well as mixtures of these substances.

The use of micro spheres, e.g. hollow micro spheres, in cable filling compounds is also described in U.S. Pat. No. 5,698,615. In this disclosure the cable filler comprises a substantially dry hydrophilic composition containing inter alia, in addition to the micro spheres, water absorbent swellable powder particles, preferably of particle size range 1-30 µm and a "parting powder" having particles of preferably $\frac{1}{100}$th the size of the swellable powder particles. Due to the hydrophilic nature of the swellable powder particles, the composition always retains some water. The parting powder particles are disposed between the swellable powder particles to prevent agglomeration as the swellable polymer particles absorb water. Suitable swellable powder particles are those based on the polyacrylic acid sodium salt. The parting powder particles are typically inorganic powders such as talcum, mica, graphite and silicates. The absorption of water by the swellable powder particles transforms the dry composition into a gel which seals the core from further water ingress. The compositions can also contain a small amount of an oil or an adhesive to reduce any potential dust hazard.

WO 99/15582 discloses a composition which includes expandable hollow micro spheres for use in encapsulation of for example semi-conductor chips. Such hollow micro spheres, similar in morphology to the micro spheres disclosed in U.S. Pat. Nos. 5,657,410 and 5,698,615, comprise a polymeric shell encapsulating a blowing agent. When heated, the polymeric shell of the expandable micro spheres gradually softens and the liquid blowing agent, typically isobutane, starts to evaporate thus expanding the microsphere.

A light wave guide lead is disclosed in U.S. Pat. No. 5,335,302 which comprises at least one light wave guide accommodated in a protective sheath and embedded in a pasty filling material containing small micro spheres. The small micro spheres, which can be solid and rigid, solid and elastic or hollow and elastic, are included as fillers to reduce the cost, and to provide improved rheological and cushioning properties. A preferred filler comprises an oil, a thixotropic agent (for example fumed silica) and an unspecified organic thickener.

SUMMARY OF THE INVENTION

In one aspect, the present invention provides a composition, particularly a composition suitable for use as a cable filler, which comprises a dispersion of micro spheres in a gel comprising an oily base and an organic polymeric gelling agent.

In another aspect, the invention provides a composition, particularly a composition suitable for use as a cable filler, which comprises a dispersion of micro spheres in a gel comprising an oily base and an organic polymeric gelling agent, the composition containing substantially no thixotropic agent other than the organic polymeric gelling agent.

In a further aspect, the invention provides a composition, particularly a composition suitable for use as a cable filler, which comprises a dispersion of micro spheres in a gel comprising an oily base and a polymeric gelling agent wherein the polymeric gelling agent comprises, consists essentially of, or consists of a thermoplastic elastomer.

Another aspect of the invention provides a composition, particularly a composition suitable for use as a cable filler, which comprises a dispersion of micro spheres in a gel comprising an oily base and a polymeric gelling agent wherein the polymeric gelling agent comprises, consists essentially of, or consists of a thermoplastic elastomer other polystyrene-isoprene rubber.

Yet another aspect of the invention provides a composition, particularly a composition suitable for use as a cable filler, which comprises a dispersion of micro spheres in a gel comprising an oily base and a polymeric gelling agent wherein the polymeric gelling agent comprises, consists essentially of, or consists of a thermoplastic elastomer, excluding compositions containing polystyrene-isoprene rubber and an organic thickener.

A further aspect of the invention provides a composition, particularly a composition suitable for use as a cable filler, which comprises a dispersion of micro spheres in a gel comprising an oily base and a thermoplastic elastomer as a gelling agent, the composition containing substantially no thixotropic agent in addition to the thermoplastic elastomer.

Another aspect of the present invention is a gel composition comprising a dispersion of organic microspheres in a gel comprising an oily base and a thermoplastic elastomer, the gel containing substantially no thixotropic agent in addition to the thermoplastic elastomer and being substantially free from silica, for example fumed silica. In the context of the present invention, the term "substantially no thixotropic agent other than the organic polymeric gelling agent" means that the composition contains less than 5% of a thixotropic agent other than the organic polymeric gelling agent, preferably less than 1% and more preferably, less than 0.2%, and the term "substantially free from silica" means that the composition contains less than 3% silica, preferably less than 1% and more preferably, less than 0.1%.

A particular embodiment of the invention is a composition, particularly a composition suitable for use as a cable filler, which comprises a dispersion of micro spheres in a gel comprising an oily base and an organic polymeric gelling agent wherein the gel is substantially free of fumed silica.

The gels of the invention may additionally contain an antioxidant.

The oily base can comprise a hydrocarbon oil or a silicone oil. Particularly preferred hydrocarbon oils include white mineral oils and poly($\alpha$-olefin) synthetic oils. The oily base typically constitutes 1-99% by weight of the gel, more preferably 5-99% by weight of the gel, in particular 80-99% by weight of the gel.

Examples of thermoplastic elastomers include thermoplastic rubbers. The thermoplastic elastomer can be a copolymer, for example a block copolymer processing a di-block, a tri-block, or a multi-arm molecular configuration. In one particular embodiment, the blocks are comprised of either rubber or polystyrene. The rubber can be saturated olefin rubber composed of ethylene, propylene or butylenes monomer units. Alternatively, the rubber can be an unsaturated olefin rubber comprising butadiene or isoprene monomer units.

Particular examples of thermoplastic elastomers include styrene-ethylene/butylene styrene tri-block copolymer (SEBS), styrene-ethylene/propylene di-block copolymer (SEP), ethylene/propylene multi-arm copolymer (EP), styrene-butadiene-styrene tri-block copolymer (SBS) and styrene-isoprene-styrene tri-block copolymer (SIS).

Commercially available thermoplastic elastomers include the copolymers available under the trade mark "Kraton" from Shell.

The polymeric gelling agent is typically used in proportions in the range 1-10% by weight of the composition, more preferably, in the range 2-9% by weight of the composition, in particular in the range 3-8% by weight of the composition.

The micro spheres can be, for example, solid rigid micro spheres, solid elastic micro spheres or compressible hollow micro spheres. Solid rigid micro spheres can be formed from a thermosetting resin such as melamine-formaldehyde resin which has a relatively low thermal expansion coefficient and in use would tend to lower the overall expansion coefficient of the gel. This is particularly advantageous where the gel may be heated during manufacture of, for example, fibre optic leads. During such processes, conventional materials tend to expand when heated leaving holes or cavities around the wave guides on cooling. The holes or cavities can, under certain conditions, lead to an increase in attenuation of the light wave guides. The melamine-formaldehyde micro spheres, available from Ubitek Company of Uchte, preferably have a diameter of <10 µm, in particular <1 µm.

Examples of solid elastic micro spheres are those comprising polyisoprene. The polyisoprene is not only elastic in its own right but can additionally absorb considerable quantities of the oily base thereby becoming even more elastic. The mean diameter of the micro spheres is preferably <10 µm, more preferably <1 µm.

One preferred embodiment of the invention uses compressible hollow micro spheres each comprising a polymeric shell encapsulating a blowing agent. The polymeric shell is generally formed from a copolymer, for example a copolymer of vinylidene chloride and acrylonitrile. The blowing agent can, for example, be isobutane or isopentane. In addition, the micro spheres can be expanded or unexpanded. The polymeric shell of the unexpanded micro spheres softens on heating, so allowing the evaporating blowing agent to expand the volume of the micro spheres.

Such hollow micro spheres whether expanded or initially unexpanded, display a high degree of elasticity and additionally have a low specific weight. Use of such micro spheres in the gels disclosed in this invention is advantageous in that they lower the overall specific weight of the gels and thus reduce or eliminate drip-out during vertical laying of the cable.

The hollow nature of the micro spheres means that the proportion of solid material is very low relative to the volume. Thus their addition to the gels of the invention leads to a reduction in the overall thermal conductivity and a reduced likelihood of decomposition of any of the components of the gel or the creation of voids under the elevated temperatures reached during cable manufacture. The superior elastic properties of the hollow micro spheres over their solid counterparts gives improved protection to, for example, light wave guides during conveying, coiling or laying. Additionally, the problem of attenuation of light waveguides due to the presence of holes or cavities within the cable filling is also reduced as any increase in volume of the bulk of the filler due to heating during cable manufacture is matched by a converse reduction in the volume of the hollow micro spheres. Due to the compressible nature of such hollow micro spheres, their typical diameters are greater than those of their solid counterparts. In fibre optic cable applications, diameters the range of the diameter of the light wave guide can be used. For expanded hollow micro spheres, the diameters will typically lie in the range 1-200 µm, more usually less than 100 µm, typically less than 75 µm, for example 15 to 55 µm. For unexpanded hollow micro spheres, the mean diameter prior to expansion is typically in the range up to 50 μm, more usually less than 30 μm, for example in the range 10 to 20 μm.

The volume proportion of the micro spheres generally differs for solid and hollow counterparts. The solid micro spheres are typically employed in the volume range 1-50% by volume of the gel (v/v), more preferably in the range 5-50% v/v. Where hollow micro spheres are used, they are typically present in the range 1-95% v/v, more preferably 5-95% v/v, in particular 50-95% v/v, the foregoing figures referring to the expanded volumes.

The anti-oxidant can be selected from those commonly used in the art. Phenolic anti-oxidants are preferred. The anti-oxidant is typically present in an amount 0.01-1% w/w, for example 0.1-1% w/w.

In a further aspect, the invention provides a composition as hereinbefore defined for use as a cable filler.

In another aspect, the invention provides a cable, such as a communications cable, containing a filler as hereinbefore defined.

In a still further aspect, the invention provides a cable comprising a conducting core surrounded by a sheath, a composition as hereinbefore defined being disposed between the conducting core and the sheath. The conducting core can be, for example, an electrical conductor or a light conductor. The electrical conductor can be, for example, a conductor for conducting electrical signals such as telephone signals.

In a further aspect, the invention provides a process for making a cable comprising a conducting core and a sheath, the process comprising the step of extruding the cable sheath onto the conducting core and interposing a composition as hereinbefore defined between the conducting core and sheath during the extrusion step.

In another aspect, the invention provides a process for preparing a gel as hereinbefore defined; the process comprising:

(a) heating the oily base to a temperature in the range 110° C. to 120° C.;
(b) adding the polymeric gelling agent to the oily base and blending to form a mixture;
(c) cooling the mixture to a temperature of less than 90° C.;
(d) adding and blending in the micro spheres; and optionally
(e) adding and blending in an anti-oxidant: and/or
(f) maintaining the mixture under vacuum to remove entrapped gas.

In a preferred embodiment, the process comprises:
(i) blending at least one oil in a heating-blending tank;
(ii) heating the blended oils to 110-120° C. in a stirred heating-blending tank;
(iii) adding and blending the polymeric gelling agent to the oily base under high shear for no more than one hour after of the oily base to a blending-cooling tank allowing the temperature of the blend to rise to more than 120-130° C.;
(iv) cooling the blend to <90° C. and transferring to a stirred main reactor;
(v) adding and blending an anti-oxidant;
(vi) adding and blending the micro spheres, drawn to the reactor under vacuum or pumping, for at least two minutes;
(vii) maintaining the vacuum for at least another 10 minutes in order to effect removal of air bubbles prior to release of the finished gel.

Although the temperature of the mixture is typically <90° C. after cooling, more preferably it is <80° C., in particular it is <70° C.

Further and particular aspects of the invention are as set out in the claims appended hereto.

BRIEF DESCRIPTION OF THE DRAWINGS

The invention will now be illustrated, but not limited, by reference to the particular embodiments shown in the accompanying drawings, in which.

DETAILED DESCRIPTION OF THE PREFERRED EMBODIMENTS

Figure 1:
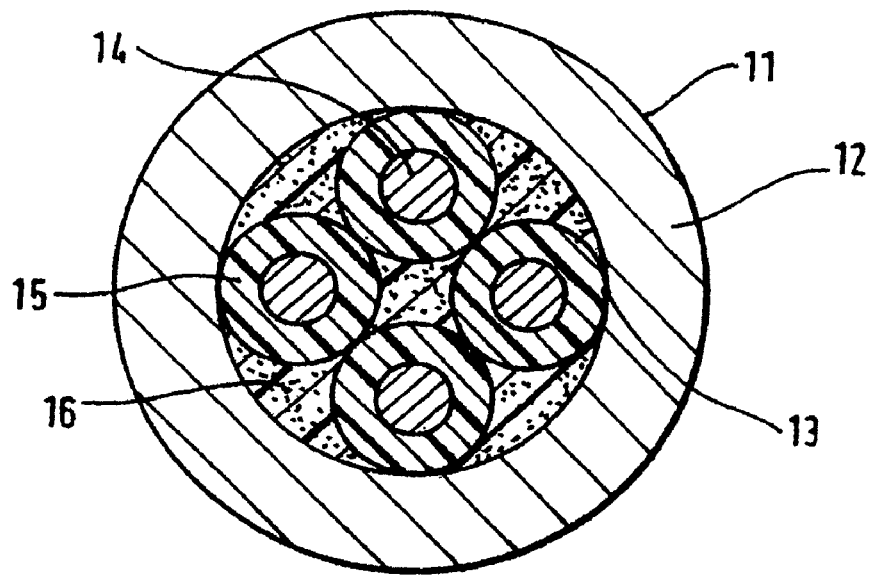
FIG. 1 shows a cross-sectional view of an electrical cable.

FIG. 1 shows a cross-sectional view of an electrical cable 11, comprising, in this example, four electrical leads 13 encased in cladding 12. The electrical leads 13 themselves comprise an electrical conductor 14, preferably of copper, and an outer insulation 15, typically of polyethylene. Interspersed between the electrical leads 13 and the outer cladding 12, is a filler gel composition 16. In this embodiment, the filler composition can comprise an oily base, a thermoplastic rubber as polymeric gelling agent and micro spheres disperse therein and optionally an anti-oxidant. The electrical cable, typically comprising a copper core, can be used for the purposes of telecommunications or distribution of electricity.

Although FIG. 1 shows a cross-sectional view of an electrical cable comprising four conductors in a star quad configuration, it will be appreciated that cables having a variety of different configurations can be used as alternatives to the configuration shown.

Figure 2:
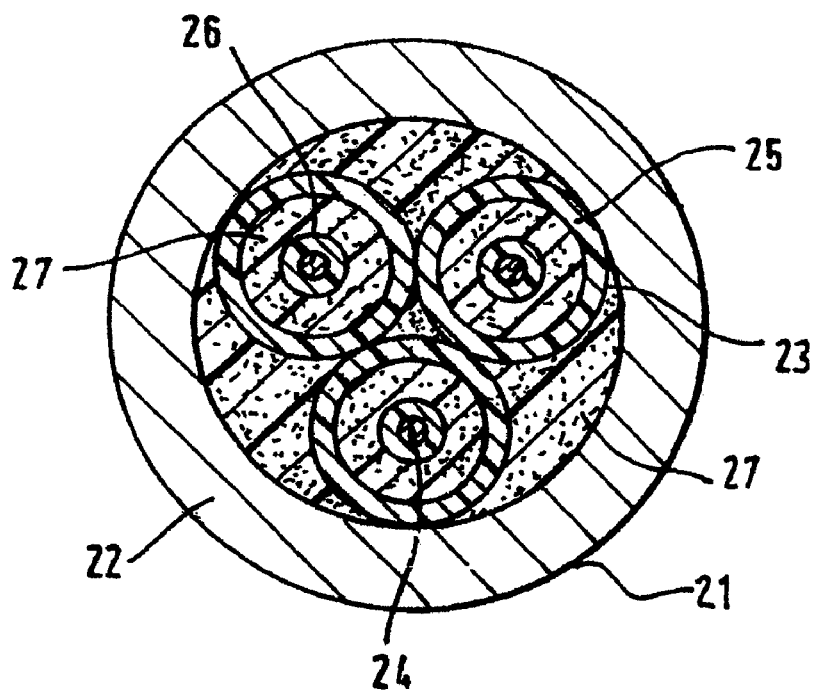
FIG. 2 shows a cross-sectional view of an optical cable.

FIG. 2 shows an optical cable 21 comprising three optical fibre buffer tubes 23 encased in cladding 22. The optical fibre buffer tubes 23 themselves consist of an optical fibre 24 provided with a protective coating 26 and a protective sheath 25. The filler composition 27 is disposed between the coated optical fibre and the protective sheath. Additionally, it fills the interstices formed between individual buffer tubes and between the buffer tubes and the internal surface of the cable cladding.

Examples of specific gels suitable for use in cables, such as the cables illustrated in FIGS. 1 and 2 are as follows:

EXAMPLE 1

A gel filler was prepared having the following composition:

| Component | Concentration (% wt.) |
| --- | --- |
| White mineral oil SN 500 (Mobil) | 89.0 |
| Thermoplastic elastomer Kraton 1701 or1702 (Shell) | 5.5 |
| Micro spheres (pre-expanded) Expancel 091 DE (Triones Chems. Int.) | 5.0 |
| Anti-oxidant Irganox L 135 (Ciba-Geigy) | 0.5 |

The gel filler of this example is suitable for filling the interstices between the tubes and conductors (flooding) and is not in direct contact with the fibre guides.

The gel was prepared as follows:

The oily base was introduced into a stirred heating-blending tank and heated to 110-120° C. before transferring to a high shear blending-cooling tank, whereupon the thermoplastic elastomer (Kraton) (in the form of granules) was added. The mixture was blended under high shear conditions using a multi-purpose immersion type mixer emulsifier (Silverson Machines Limited, Model GDD 25) for no more than 60 minutes. During the blending process, the temperature of the mixture was allowed to rise to 120-130° C. The mixture was cooled by means of a cold water chiller system, and the chilled mixture was transferred to a stirred main reactor where the anti-oxidant was added. A vacuum was then created inside the reactor in order to suck in the micro spheres which were mixed into the blend over a period of at least two minutes. The vacuum was maintained for at least a further ten minutes in order to effect removal of any air bubbles. The vacuum was then released, the stirrer switched off and samples taken prior to release of the finished gel from the main reactor.

The product was characterised by a number of tests, the results of which are summarised in Table 1 below. The thermal conductivities referred to in the table were determined as follows:

Specimen discs were created by scooping the gels into a pair of nylon rings of mean internal diameter 70.1 mm and mean thickness 10.03 mm and placing cling film above and below. A small correction was made to allow for the extra interface introduced by the cling film. The thermal conductivity of the specimens was measured using a 76 mm guarded hotplate. A pair of specimen discs were mounted, under the pressure of two cooled plates, on either side of a guarded heater plate. The cooled plates were maintained at a constant temperature to better than ±0.05° C. The surfaces of the plates had emittances of better than 0.9. The temperature of the annular guard on the heater plate was matched to that of the central part to better than ±0.01° C. in order to minimise lateral heat flow in the specimens. The heater plate and the specimens were insulated with a glass fibre blanket to further reduce edge heat losses. The temperature drop through the specimens was fixed at 14° C. and about 5 hours was allowed for thermal equilibrium to be established before final readings were taken.

The aging test was derived from YD/T839.4-1996 (PRC Method) except that the temperature and duration of the test was altered.

| Property | Value | Test Method |
| --- | --- | --- |
| Density (20° C.) g/ml | 0.356 | ASTM D 1475 |
| Viscosity (100 s$^{-1}$, 25° C.) Pa · s | 23.63 | Haake VT500 |
| Tube drainage (7 mm id/80° C./24 hrs.) | Pass | EIA/TIA-455-81A |
| Cone Penetration (23° C.) dmm | 335 | ASTM D937 |
| Cone Penetration (−30° C.) dmm | 167 | ASTM D937 |
| Cone Penetration (−40° C.) dmm | 120 | ASTM D937 |
| Oil separation (80° C./24 hrs.) % wt. | 0 | FTM791(321) |
| Volatile loss (80° C./24 hrs.) % w/w | 0.17 | FTM791(321) |
| OIT (190° C.) min. | 34.75 | ASTM D3895 |
| Thermal conductivity (23° C.) W/m · K | 0.077 | see above |
| Thermal conductivity (80° C.) W/m · K | 0.078 | see above |
| Hydrogen generation (80° C./24 hrs.) μl/g | 0.010 | |
| Acid Value mgKOH/g | 0.036 | BS2000 |
| Aging (100° C./240 hrs.) | Pass | see above |
| UV exposure (25° C./14 days) | Pass | |
| Temperature exposure (240° C./5 mins.) | Pass | |

OIT = Oxidative induction time

Figure 3:
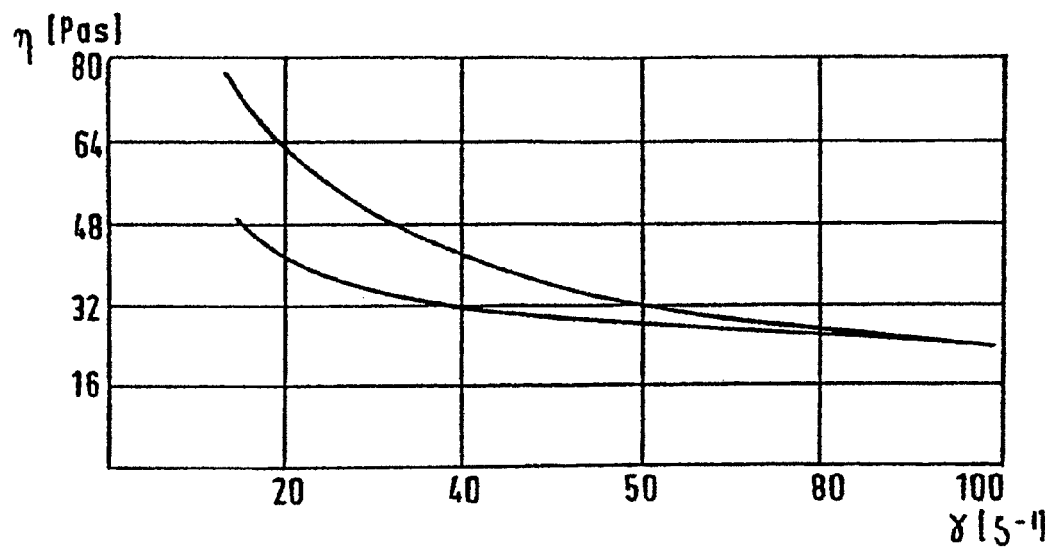
FIG. 3 is a graph of viscosity against shear rate for the composition of Example 1 at 25° C.

Table 1 shows that the density of the gel is low which contributed to good anti-drip properties (measured at 80° C.). Low temperature performance was assessed by cone penetration at −40° C. whilst high temperature performance was tested by a combination of the drip test, oil separation and volatile loss tests all carried out at 80° C. and the oxidative induction time test carried out at 190° C. An oxidative induction time in excess of 20 minutes is desirable. The results indicate that the gel has a working temperature range of −40 to +80° C. Furthermore the rheological behaviour of the gel, shown in FIG. 3, is thixotropic (shear thinning) allowing for cold pumping and processing, and thus cable filling in the absence of voids created by gel shrinkage.

Thermal conductivity was determined at 23° C. and 80° C. The values for the conductivity were low reflecting the low density of the gel, and varied little with temperature suggesting a material possessing a disordered structure. The good insulating properties indicated a material possessing good resistance to thermal decomposition that can occur at the elevated temperatures reached during cable manufacture. In addition, the gel would be less sensitive to the thermal expansion and contraction that can take place during cable manufacture leading to the formation of voids in the cable filling. For purposes of comparison, the thermal conductivities of a range of materials are given in Table 2.

TABLE 2

Thermal Conductivities of Various Materials

| Material | Thermal conductivity W/m · K | Comment |
| --- | --- | --- |
| Aluminium | 200 | Very good conductor |
| Water | 0.6 | |
| Olive oil | 0.17 | |
| Paraffin | 0.15 | |
| Air | 0.024 | Very good insulator |

The gel showed good aging properties and uv and temperature resistance. There was also low hydrogen gas generation.

EXAMPLE 2

A similar gel filler was prepared in a similar manner to that described in Example 1 but with a different grade of mineral oil. The gel was suitable for use in small pair telephone copper cable filling and flooding applications.

The gel was subject to a number of physical tests. The results of the physical tests were similar to those of the composition of Example 1 and therefore only the electrical properties are quoted in Table 3.

TABLE 3

Physical Properties

| Property | Value | Test Method |
| --- | --- | --- |
| Dielectric constant (23° C.) | 1.62 | ASTM D924 |
| Dielectric dissipation factor (1 MHz) | $4.4 \times 10^{-4}$ | ASTM D924 |
| Volume resistivity (23° C.) Ohm · cm | $2.8 \times 10^{15}$ | ASTM D257 |
| Break down voltage kV | 86 | |

The gel is characterised by a low relative permittivity (1.62) and a high volume resistivity ($2.8 \times 10^{15}$ Ohm.cm). For purposes of comparison, the relative permitivities of a number of materials are given in Table 4.

TABLE 4

Relative Permitivities of Various Materials

| Material | Relative permitivity |
|---|---|
| Air (normal pressure) | 1.0005 |
| Paraffin wax | 2 |
| Paraffin oil | 4.7 |
| Glass | 5-10 |
| Mica | 6 |
| Methyl alcohol | 32 |
| Water | 81 |

EXAMPLE 3

A gel suitable for use in filling loose tubes and interstitial filling between ribbons and open slotted cores, was prepared in a similar manner to that described in example 1. The formula for this gel is set out below:

| Component | Concentration (% wt.) |
|---|---|
| Poly α-olefin oil[a] Durasyn 166 (Amoco) | 66.37 |
| White mineral oil Whiterex 250 (BP/Mobil) | 22.13 |
| Thermoplastic elastomer Kraton 1701 or1702 (Shell) | 7.5 |
| Micro spheres (pre-expanded) Expancel 091 DE (Triones Chems. Int.) | 3.5 |
| Anti-oxidant Irganox L 135 (Ciba-Geigy) | 0.5 |

[a]The poly α-olefin oil is also supplied by BP/Mobil as SHF 61

The gel was subject to a number of physical tests. The results of the physical tests, which were similar to the results of the composition of Example 1, are shown in Table 5.

In addition, the tensile strength and coating strip force of optical fibres were tested according to the standards FOTP-28 and FOTP-178 respectively. The optical fibre was CPC6 fired by Siecor. The tests were carried out after aging of the fibres in forced air chambers for 30 days at 85±1° C. whilst immersed in the gel. Measurements were carried out at 20° C. and 70% relative humidity. The tensile strength was measured on thirty 0.5 mm samples from four different groups at a rate of elongation of 500±50 mm/min. 50 mm samples were used for the coating strip force tests using a stripping tool at a speed of 500±50 mm/min. Average tensile strength and coating strip force values for a control sample were 68.89 N and 3.61 N respectively.

TABLE 5

Physical Properties

| Property | Value | Test Method |
|---|---|---|
| Density (20° C.) g/ml | 0.438 | ASTM D 1475 |
| Viscosity (200 s$^{-1}$, 25° C.) Pa · s | 7.95 | Haake VT500 |
| Tube drainage (7 mm id/80° C./24 hrs.) | Pass | EIA/TIA-455-81A |
| Cone Penetration (23° C.) dmm | 396 | ASTM D937 |
| Cone Penetration (−40° C.) dmm | 250 | ASTM D937 |
| Oil separation (80° C./24 hrs.) % wt. | 0 | FTM791(321) |
| Volatile loss (80° C./24 hrs.) % w/w | 0.06 | FTM791(321) |
| OIT (190° C.) min. | 31.04 | ASTM D3895 |
| Thermal conductivity (23° C.) W/m · K | 0.077 | see example 1 |
| Thermal conductivity (80° C.) W/m · K | 0.078 | see example 1 |

TABLE 5-continued

Physical Properties

| Property | Value | Test Method |
|---|---|---|
| Hydrogen generation (80° C./24 hrs.) μl/g | 0.015 | |
| Relative permitivity (50 Hz, 25° C.) | 1.65 | ASTM D150 |
| Volume resistivity (23° C.) Ohm · cm | 19 × 10$^{14}$ | ASTM D257 |
| Tensile strength (20° C./70% RH) N | 65.07 | FOTP-28 |
| Coating strip force (20° C./70% RH) N | 3.88 | FOTP-178 |
| Aging (100° C./240 hrs.) | Pass | see example 1 |
| UV exposure (25° C./14 days) | Pass | |
| Temperature exposure (240° C./5 mins.) | Pass | |

OIT = Oxidative induction time

Figure 4:
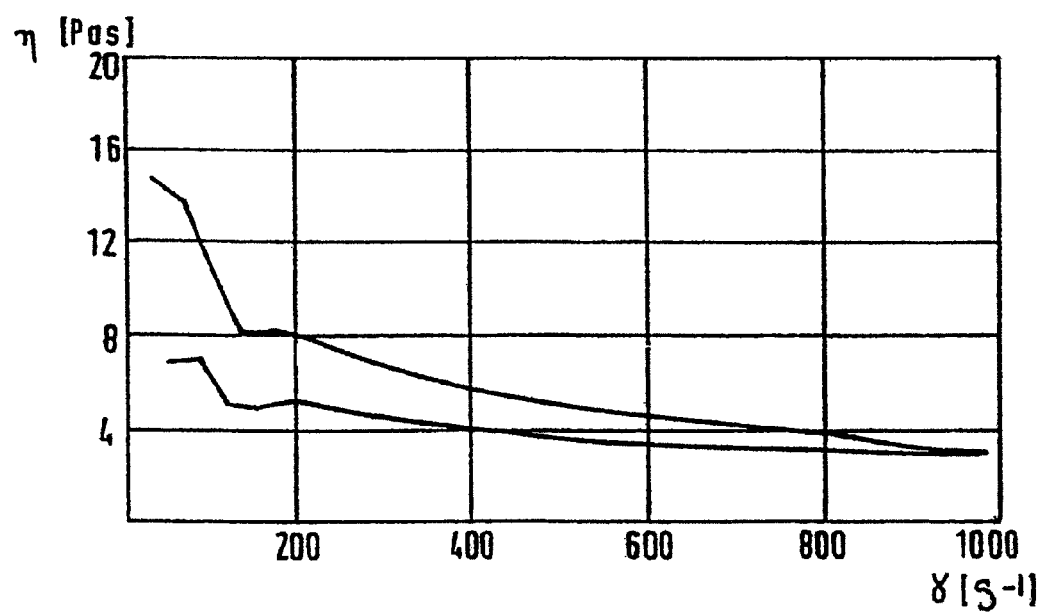
FIG. 4 is a graph of viscosity against shear rate for the composition of Example 2 at 25° C.

The shear sensitive behaviour of the viscosity is illustrated in FIG. 4 and shows that the gel is thixotropic or shear thinning. This gel, although of lower viscosity than the gel of example 1, still passed the drainage test. The low temperature performance, characterised by the cone penetration at −40° C., was exceptional. This is particularly important as this gel is used in direct contact with optical fibres and must maintain flexibility at low temperatures to avoid applying stresses to the aforementioned fibres or micro bending caused by contraction which can lead to an increase in attenuation. The tensile strength and coating strip force results suggested that there was no deterioration in the mechanical strength of the fibres or degradation in the fibre coating after exposure to the gel.

EXAMPLE 4

This gel, formulated for filling loose tubes and interstitial filling between ribbons and open slotted cores particularly for use with polypropylene cable polymers, was prepared in a similar manner to that described in example 1. The formula for this gel is set out below:

| Component | Concentration (% wt.) |
|---|---|
| Silicone oil F111/5000 (Ambersil) | 94.7 |
| Fumed silica M5 (Cabot) | 1.8 |
| Micro spheres (pre-expanded) Expancel 091 DE (Triones Chems. Int.) | 3.0 |
| Cross-linking additive | 0.5 |

The resulting gel was subject to a number of physical and chemical tests, the results of which are summarised in Table 6 below.

The gel was tested for compatibility with polypropylene using the following method:

Six 50 mm long samples of buffer loose tubes were weighed to 0.00001 g. Five of the samples were subsequently immersed in the gel and all six aged in an air-circulated oven at 80° C. for two weeks. The samples were then re-weighed.

TABLE 6

Physical Properties

| Property | Value | Test Method |
|---|---|---|
| Density (20° C.) g/ml | 0.51 | ASTM D 1475 |
| Viscosity (100 s$^{-1}$, 25° C.) Pa · s | 32.86 | Haake VT500 |
| Tube drainage (7 mm id/80° C./24 hrs.) | Pass | EIA/TIA-455- |

TABLE 6-continued

Physical Properties

| Property | Value | Test Method |
|---|---|---|
| Cone Penetration (23° C.) dmm | 340 | 81A ASTM D937 |
| Cone Penetration (−40° C.) dmm | 280 | ASTM D937 |
| Oil separation (80° C./24 hrs.) % wt. | 4.97 | FTM791(321) |
| Volatile loss (80° C./24 hrs.) % w/w | 0.11 | FTM791(321) |
| OIT (190° C.) min. | 33.15 | ASTM D3895 |
| Hydrogen generation (80° C./24 hrs.) µl/g | 0.012 | |
| Tensile strength (20° C./70% RH) N | 66.00 | FOTP-28 |
| Coating strip force (20° C./70% RH) N | 4.10 | FOTP-178 |
| Aging (100° C./240 hrs.) | Pass | see example 1 |
| UV exposure (25° C./14 days) | Pass | |
| Temperature exposure (240° C./5 mins.) | Pass | |
| Polypropylene compatibility (80° C./2 wks.) | Pass | see above |

OIT = Oxidative induction time

The results from the low temperature cone penetration, and the oil separation, volatile loss and oxidative induction time experiments suggest that the operating range of this gel is −40 to +80° C. The tensile strength and coating strip force results suggested that there was no deterioration in the mechanical strength of the fibres or degradation in the fibre coating after exposure to the gel. The gel was found to be compatible with polypropylene as there was no weight gain in the immersed tube samples after aging.

EXAMPLE 5

This gel, formulated for cable flooding and interstitial filling applications and is a swellable water blocking gel, was prepared in a similar manner to that described in example 1. The formula for this gel is set out below:

| Component | Concentration (% wt.) |
|---|---|
| White mineral oil SN 500 (Mobil) | 89.5 |
| Thermoplastic elastomer Kraton 1701 or 1702 (Shell | 4.0 |
| Fumed silica M5 (Cabot) | 3.0 |
| Micro spheres (unexpanded) Expancel 551 DU (Triones Chems. Int.) | 2.5 |
| Anti-oxidant Irganox L135 (Ciba-Geigy) | 0.5 |
| Monopropylene glycol PGUSP-1S (Arco Chemical) | 0.5 |

The gel was subject to a number of physical tests, the results of which are summarised in Table 7 below.

TABLE 7

Physical Properties

| Property | Value | Test Method |
|---|---|---|
| Density (20° C.) g/ml | 0.87 | ASTM D 1475 |
| Viscosity (200 s$^{-1}$, 25° C.) Pa · s | 7.00 | Haake VT500 |
| Cable drainage (80° C./24 hrs.) | Pass | EIA/TIA-455-81A |
| Cone Penetration (25° C.) dmm | 340 | ASTM D937 |
| Oil separation (80° C./24 hrs.) % wt. | 0 | FTM791(321) |
| OIT (190° C.) min. | >40 | ASTM D3895 |
| Hydrogen generation (80° C./24 hrs) µl/g | <0.02 | |

TABLE 7-continued

Physical Properties

| Property | Value | Test Method |
|---|---|---|
| Acid Value mgKOH/g | <0.5 | BS2000 |
| Tensile strength (20° C./70% RH) N | 66.00 | FOTP-28 |
| Coating strip force (20° C./70% RH) N | 4.10 | FOTP-178 |

OIT = Oxidative induction time

The presence of unexpanded hollow micro spheres in the gel meant that the filler increased in volume by 1-10% on heating in the temperature range 95-140° C. Such heat can originate from the extrusion head during manufacture of, for example, fibre optic cables. The swellable nature of the gel can help eliminate voids in the cable created on shrinkage of the cable filler and ensure a watertight seal around the core. The elimination of voids also reduces the likelihood of problems of attenuation associated with fibre optic cables.

The gel can also be used for filling beneath the metallic amine where over-flooding with petroleum jelly type material can prevent sealing of the overlap whilst under-flooding may create a water path within the cable and lead to the problems of attention described above.

It will readily be apparent that numerous modifications and alterations can readily be made to the compositions exemplified in the Examples without departing from the principles underlying the invention and all such modifications and alterations are intended to be embraced by this application.

The invention claimed is:

1. A cable filling or cable flooding composition comprising a dispersion of micro spheres in a gel comprising an oily base and an organic polymeric gelling agent, the organic polymeric gelling agent comprising a thermoplastic elastomer; wherein the composition contains substantially no thixotropic agent in addition to the thermoplastic elastomer and wherein the organic polymeric gelling agent is present in an amount in the range of 1-10% by weight of the composition.

2. A composition according to claim 1 wherein the organic polymeric gelling agent comprises a thermoplastic elastomer other than polystyrene-isoprene rubber.

3. A composition according to claim 2 wherein the organic polymeric gelling agent excludes compositions containing an organic thickener.

4. A composition according to claim 1, the composition being substantially free from silica.

5. A composition according to claim 4, the composition being substantially free from fumed silica.

6. A composition according to claim 1, wherein the oily base comprises at least one oil selected from naphthenic processing oil, paraffinic processing oil, mineral oil, synthetic oils and silicone oil.

7. A composition according to claim 6, wherein the oily base comprises a poly(α-olefin) synthetic oil.

8. A composition according to claim 1 wherein the oily base is present in an amount ranging from 1 to 99% by weight of the composition.

9. A composition according to claim 1 wherein the oily base is present in an amount ranging from 50 to 99% by weight of the composition.

10. A composition according to claim 1, wherein the oily base is present in an amount ranging from 80-99% by weight of the composition.

11. A composition according to claim 1 wherein the organic polymeric gelling agent is a thermoplastic rubber.

12. A composition according to claim 1, wherein the organic polymeric gelling agent is present in an amount ranging from 2-9% by weight of the composition.

13. A composition according to claim 1, wherein the organic polymeric gelling agent is present in an amount ranging from 3-8% by weight of the composition.

14. A composition according to claim 1 containing one or more anti-oxidants.

15. A cable containing as a filler a composition comprising a dispersion of micro spheres in a gel comprising an oil base and an organic polymeric gelling agent, the organic polymeric gelling agent comprising a thermoplastic elastomer; wherein the composition contains substantially no thixotropic agent in addition to the thermoplastic elastomer.

16. A cable according to claim 15 wherein said cable comprises a conducting core surrounded by a sheath, and said filler is disposed between the conducting core and the sheath.

17. A cable according to claim 15 wherein the conducting core is an electrical conductor or a light conductor.

18. A process for making a cable comprising a conducting core and a sheath, the process comprising extruding the cable sheath onto the conducting core and interposing a composition according to claim 1 between the conducting core and sheath during the extrusion step.

19. A process for preparing a composition comprising a dispersion of micro spheres in a gel comprising an oily base and an organic polymeric gelling agent, the organic polymeric gelling agent comprising a thermoplastic elastomer; wherein the composition contains substantially no thixotropic agent in addition to the thermoplastic elastomer; said process comprising:
   a. heating the oily base to a temperature in the range of 110° C. to 120° C.;
   b. adding the organic polymeric gelling agent to the oily base and blending to form a mixture;
   c. cooling the mixture to a temperature of less than 90° C.;
   d. adding and blending in the micro spheres;
   e. optionally adding and blending in an anti-oxidant; and
   f optionally maintaining the mixture under vacuum to remove entrapped gas.

20. A process for manufacturing a composition comprising a dispersion of micro spheres in a gel comprising an oily base and an organic polymeric gelling agent, the organic polymeric gelling agent comprising a thermoplastic elastomer; wherein the composition contains substantially no thixotropic agent in addition to the thermoplastic elastomer, said process comprising:
   a. blending at least one oil in a heating-blending tank,
   b. heating the blended oils to 110-120° C., in a stirred heating-blending tank;
   c. adding and blending the organic polymeric gelling agent to the oily base under high shear for no more than one hour after transfer of the oily base to a blending-cooling tank, allowing the temperature of the blend to rise to more than 120-130° C.;
   d. cooling the blend to <90° C. and transferring to a stirred main reactor;
   e. adding and blending in an anti-oxidant;
   f adding and blending the micro spheres, drawn to the reactor under vacuum or pumping, for at least two minutes; and
   g. maintaining vacuum for at least another 10 minutes in order to effect removal of air bubbles prior to release of the finished composition.

* * * * *